(12) United States Patent
Wang et al.

(10) Patent No.: US 8,964,620 B2
(45) Date of Patent: Feb. 24, 2015

(54) METHOD AND APPARATUS FOR TRANSMITTING AND RECEIVING MBMS DATA

(75) Inventors: Yonggang Wang, Shanghai (CN); Yu Chen, Shanghai (CN); Hua Chao, Shanghai (CN); Nan Wang, Shanghai (CN); Zhongji Hu, Shanghai (CN); Pingping Xing, Shanghai (CN); He Wang, Shanghai (CN)

(73) Assignee: Alcatel Lucent, Boulogne-Billancourt (FR)

( * ) Notice: Subject to any disclaimer, the term of this patent is extended or adjusted under 35 U.S.C. 154(b) by 1580 days.

(21) Appl. No.: 12/306,630

(22) PCT Filed: Jun. 21, 2007

(86) PCT No.: PCT/CN2007/001953
§ 371 (c)(1),
(2), (4) Date: Dec. 24, 2008

(87) PCT Pub. No.: WO2008/003227
PCT Pub. Date: Jan. 10, 2008

(65) Prior Publication Data
US 2009/0279469 A1 Nov. 12, 2009

(30) Foreign Application Priority Data
Jun. 27, 2006 (CN) .......................... 2006 1 0028204

(51) Int. Cl.
*H04W 4/06* (2009.01)
*H04W 4/00* (2009.01)
(Continued)

(52) U.S. Cl.
CPC .......... *H04W 72/005* (2013.01); *H04J 11/0069* (2013.01); *H04L 5/0007* (2013.01); *H04L 5/005* (2013.01); *H04L 5/0051* (2013.01); *H04L 25/0226* (2013.01); *H04L 27/2601* (2013.01)
USPC ........... 370/312; 370/330; 370/328; 370/329; 455/517; 455/219; 455/225

(58) Field of Classification Search
CPC ....................................................... H04W 4/06
USPC ......... 370/312, 337, 344, 347, 390, 338, 339, 370/328, 329, 330; 455/517, 219, 225, 551, 455/560
See application file for complete search history.

(56) References Cited

U.S. PATENT DOCUMENTS

| | | | | |
|---|---|---|---|---|
| 2005/0286465 | A1* | 12/2005 | Zhuang | 370/329 |
| 2009/0225693 | A1* | 9/2009 | Yi et al. | 370/312 |
| 2009/0323642 | A1* | 12/2009 | Tanno et al. | 370/336 |

FOREIGN PATENT DOCUMENTS

| | | | |
|---|---|---|---|
| CN | 1467938 A | 1/2004 | |
| CN | 1972268 A | 5/2007 | |

(Continued)

OTHER PUBLICATIONS

International Search Report.
(Continued)

*Primary Examiner* — Derrick Ferris
*Assistant Examiner* — Abdelnabi Musa
(74) *Attorney, Agent, or Firm* — Fay Sharpe LLP

(57) ABSTRACT

The invention provides a method and device for sending MBMS traffic data based on MBMS Cell Group, the method comprises the following steps: channel coding and modulating said MBMS traffic data; determining said MBMS cell group-specific scrambling code; determining said MBMS cell-specific scrambling code; scrambling said MBMS traffic data with said MBMS cell group-specific scrambling code, and adding reference signal scrambled with said MBMS cell group-specific scrambling code and reference signal scrambled with said MBMS cell-specific scrambling code; and sending scrambled MBMS reference signal and data. With the method and the corresponding device provided by the invention, it is easy to realize RF combining or RF combining and soft combining simultaneously at UE to obtain diversity gain.

39 Claims, 11 Drawing Sheets

(51) Int. Cl.
*H04W 72/00* (2009.01)
*H04J 11/00* (2006.01)
*H04L 5/00* (2006.01)
*H04L 25/02* (2006.01)
*H04L 27/26* (2006.01)

(56) References Cited

FOREIGN PATENT DOCUMENTS

| WO | 2005011157 A1 | 2/2005 |
| WO | WO 2005/011157 A1 | 2/2005 |
| WO | 2007024073 A1 | 3/2007 |
| WO | WO 2007/024073 A1 | 3/2007 |

OTHER PUBLICATIONS

R1-060086, TSG RAN WG1 LTE Ad Hoc, Text Proposal E-UTRA MBMS, Jan. 23-25, 2006, 1 page.
Speth et al., Optimum Receiver Design for OFDM-Based Broadband Transmission—Part II: A Case Study; IEEE Transactions on Communiocation, vol. 49, No. 4, Apr. 2001, pp. 571-578.
R1-061189, 3rd Generation Partnership Project (3GPP), 3GPP TSG RAN WG1 Meeting #45, Investigations on Cell-Common Pilot Channel structure for MGMS in E-UTRA Downlink, May 8-12, 2006, 10 pages.
European Pat. App. No. 07721526.7, Extended European Search Report, mailed Mar. 28, 2014, 16 pages.
R1-060304, 3rd Generation Partnership Project (3GPP), 3GPP TSG RAN WG1 Meeting #44, MBMS Channel Structure for E-UTRA Downlink, Feb. 13-17, 2006, 5 pages.
R1-060434, 3rd Generation Partnership Project (3GPP), 3GPP TSG RAN WG1 Meeting #44, Investigations on Pilot Channel Structure for MBMS in E-UTRA Downlink, Feb. 13-17, 2006, 9 pages.
R1-061013, 3rd Generation Partnership Project (3GPP), 3GPP TSG RAN WG1 Meeting #44bis,Text Proposal on Macro Diversity for MBMS, Mar. 27-31, 2006, 2 pages.
R1-061111, 3rd Generation Partnership Project (3GPP), 3GPP TSG RAN WG1 Meeting #45,Text Proposals on LTE Physical Layer Description for TR 25.912, Chapter 7, May 8-12, 2006, 11 pages.
Chinese Pat. App. Publication No. CN1467938A, Thompson Innovation Record View, Bibliography with English Abstract, printed Jan. 1, 2012, 2 pages.
Chinese Pat. App. Publication No. CN1972268A, Thompson Innovation Record View, Bibliography with English Abstract, printed Jan. 1, 2012, 2 pages.
PCT Pat. Application No. PCT/CN2007/001953, Written Opinion of the International Searching Authority, mailed Sep. 27, 2007, 5 pages.

\* cited by examiner

METHOD AND APPARATUS FOR TRANSMITTING AND RECEIVING MBMS DATA

FIELD OF THE INVENTION

The present invention relates to mobile telecommunication in 3GPP LTE based on OFDMA, and particularly to the method and device for sending and receiving E-MBMS traffic data in evolved UMTS radio access network (E-UTRAN).

BACKGROUND OF THE INVENTION

3GPP LTE is the largest new technology R&D project launched by 3GPP in recent two years. Because, in 3GPP LTE, downlink transmission technology utilizes new Physical Layer Transmission technology, i.e. OFDM, E-MBMS under this circumstance has many brand new characters compared to MBMS in WCDMA Release6 Protocol.

In 3GPP LTE, downlink transmission scheme is based on conventional OFDM using a cyclic prefix (CP), with a sub-carrier spacing $\Delta f$=15 kHz and a cyclic-prefix (CP) duration $T_{cp} \approx 4.7/16.7$ µs (short/long CP). Long CP aims to be applied to multi-cell MBMS transmission and macro-cell environment with long inter-site distance.

MBMS transmission may be performed in the following two ways: one is multi-cell transmission and the other is single-cell transmission. In case of multi-cell transmission, the cells and contents are synchronized to enable the user equipment (UE) to combine the energy from multiple radio links without additional receiver complexity. Said combining is coherent combining, which is also called RF combining. RF combining requires all signals to arrive at UE receiver within the window defined by CP, therefore tight inter-cell synchronization is needed. In addition, considering the reference (pilot) signal combining, under condition of reference signals are designed as common pilot signals of the cell, since the MBMS reference signals of all cells are identical, RF combining of signals can be done.

However, in cases of asynchronism between cells, or in bad urban environment with large multi-path time delay spread, signals arriving UE receiver may be out of CP window and these signals will lead to interference between symbols. Moreover, because pilot and data of broadcast service are identical, signals are strong coherence. If these signals arriving are not within CP window, interference between cells will affect pilot estimation and data receiving, which great attention must be paid to.

In 3GPP LTE, it proposes that downlink reference signal(s) can be used for:
- downlink-channel-quality measurements
- downlink channel estimation for coherent demodulation/detection at the UE
- cell search and initial acquisition The basic reference signal structure discussed in 3GPP LTE is illustrated in FIG. 1. As seen in FIG. 1, reference symbol, which is also called the first reference symbol, locates in the first OFDM symbol position of the sub-carrier which is allocated to downlink data transmission. Additional reference symbol, which is also called the second reference symbol, locates in the fifth OFDM symbol position of the sub-carrier which is allocated to downlink data transmission. In implementation, MBMS transmission, reference symbol and additional reference symbol could be different and have different repeat frequency.

Based on aforesaid structure, there are several existing methods for sending MBMS data in 3GPP LTE. In these methods, MBMS data are channel coded and modulated, and then scrambling code is selected. The selected scrambling code could be a common scrambling code for all cells, or a dedicated scrambling code for each cell. Based on the selected scrambling code, pilot and/or date are scrambled with the selected scrambling code and then sent. The scrambled pilot and data structures are illustrated in FIGS. 2A, 2B and 2C.

FIGS. 2A, 2B and 2C respectively show data structures scrambled with different scrambling codes, wherein, abscissa represents time domain, ordinate represents frequency domain, and each rectangle grid represents a symbol. FIG. 2A shows pilot and data structures generated by scrambling pilot with a common scrambling code of the cells. FIG. 2B shows pilot and data structures generated by scrambling pilot with a common scrambling code of cells and a cell-specific scrambling code. FIG. 2C shows pilot and data structures generated by scrambling pilot with a cell-specific scrambling code and scrambling different MBMS traffic data with service scrambling code.

Though aforesaid existing data sending methods could scramble pilot and data, they are on the premise of tight synchronization of all E-nodeBs. In this case, signals of surrounding cells could arrive at the UE receiver within the CP window. Even though there are signals leaked out of CP window, it is considered that the interference impact of their power on the receiver could be neglected.

However, in cases of inter-cell asychronism, or in bad urban environment with large multi-path time delay spread, signals arriving at the UE receiver may be out of the CP window. Moreover, because pilot and content of broadcast service are identical, signals are strongly coherent so that the inter-cell interference will affect the pilot estimation and data receiving.

To solve the problem that signals arriving at the UE receiver not within CP window due to inter-cell asychronism may cause interference, the applicant proposes a technical solution of dividing multiple cells into cell groups on basis of considering the E-nodeB synchronization, downlink macro diversity and UE receiving combining in E-UTRAN. Wherein, a scheme of cell groups division in E-UTRAN is proposed. In this scheme, it divides all cells into multiple MBMS cell groups according to the time delay of radio propagation. Each cell group contains several E-nodeBs and their cells/sectors. The diameter of cell group coverage is equal to or slightly less than the distance with radio propagation in long CP window, that is to say, when a UE locates in a cell group, all signals transmitted from E-NodeBs in this cell group should arrive at UE within the CP window.

To transmit MBMS on the basis of above MBMS cell group division, method of sending and receiving data as well as corresponding device and system adapted for the scheme of said MBMS cell group division are needed.

As the evolution of MBMS in 3GPP, E-MBMS utilizes new Physical Layer Transmission technology, i.e. OFDM, which is quite different from that of MBMS. It is the different Physical Layer Transmission technology that makes E-MBMS has many brand new characters as compared to MBMS defined in WCDMA Release6 Protocol.

In 3GPP LTE, downlink transmission scheme is based on conventional OFDM using a cyclic prefix (CP), with a sub-carrier spacing $\Delta f$=15 kHz and a cyclic-prefix (CP) duration $TCP \approx 4.7/16.7$ µs (short/long CP). Wherein, long CP aims to be applied to multi-cell MBMS transmission and macro-cell environment with long inter-site distance. In most cases, multicast traffic and unicast traffic are transmitted by time domain multiplexed (TDM), or on the separate carrier respectively.

Here, multicast service utilizes a single long CP length. In the cases of transmitting multicast traffic and unicast traffic by frequency domain multiplexed (FDM), the long CP is also required to meet the need of multicast traffic with precedence.

In synchronous E-UTRAN system, since signals arrive at the UE receiver within CP window, the inter-cell interference will not cause big problems. Because the time delay spread of signals within CP window will not cause inter-symbol interference (ISI) of OFDM symbols, these time delay spread signals could be combined in frequent domain after FFT processing. However, in other cases, interference from surrounding cells is beyond the bound of CP window. Because the contents of broadcast traffic are identical, their signals are strongly coherent. Signals out of the CP window will cause severe ISI. The network with this problem could have got:

inter-cell asynchronism;

large multi-path time delay (e.g. BU: bad urban environment)

In asynchronous system synchronized by physical layer synchronization technology, timing reference of different NodeBs are independent, and there could a certain time drift between cells. In 3GPP UMTS, the frame structure of the cells could be slowly sliding relative to each other. The absolute accuracy requirement of the drifting on the timing reference of a cell must be less than ±0.05 ppm.

With that accuracy, the relative time drift between two cells could be as much as a long CP window length (16.7 μs) per 3 minutes. Thus, the inter-NodeB synchronization within whole E-NodeBs in the service area of MBMS shall be performed once every 3 minutes, this would be too complex and inefficient. Further, the re-synchronization procedure would be too frequent.

Assuming all of the E-NodeBs are synchronous, that is to say, the system is synchronous system. The signals with same content transferred from surrounding cells don't always arrive within the window defined by CP when the radio propagation is in the Bad Urban environment and with inter-site distance of 1732 m. Wherein, BU is a typical urban channel environment in the COST 207 model adopted by 3GPP LTE, and inter-site distance of 1732 m between NodeBs is a bad macro-cell configuration mode adopted by 3GPP LTE. According to the COST 207 model, in bad urban environment, the fifth path is 5 μs after the main path and has −2 dB mean power, and the sixth path is 6.6 μs after the main path and has −4 dB mean power. Therefore, even in synchronous system, it is probable that considerable power is leaked out of the CP windows which would turn to the inter-symbol interference (ISI)

However, it is assumed that all E-NodeBs are strictly synchronous in the prior art (actually it isn't), and signals from any NodeB in a wide range could arrive at UE within the CP window. Even though they don't arrive within CP window, it is considered that the impact of the power on UE could be neglected. It is obvious that because the assumed scene couldn't be satisfied in practice, the signals arriving outside the CP window will affect the pilot estimation and data receiving at the receiver.

Therefore, a method and device are required to avoid the signals arriving out of the CP window from causing ISI.

SUMMARY OF THE INVENTION

The invention aims to provide a method for sending MBMS traffic data based on MBMS cell groups, comprising the following steps: channel coding and modulating said MBMS traffic data; determining said MBMS cell group-specific scrambling code; determining said MBMS cell-specific scrambling code; based on the coded and modulated MBMS traffic data, scrambling said MBMS traffic data with said MBMS cell group-specific scrambling code, and adding reference signal scrambled with said MBMS cell group-specific scrambling code and reference signal scrambled with said MBMS cell-specific scrambling code; and sending the scrambled MBMS reference signal and data.

According to the first aspect of the invention, there is provided a method, for receiving MBMS data based on MBMS cell groups, comprising the following steps: receiving scrambled MBMS reference signal and data; determining MBMS cell group-specific scrambling code for descrambling; determining MBMS cell-specific scrambling code for descrambling; descrambling the received MBMS reference signal and data with the determined scrambling codes; and channel decoding and demodulating the descrambled MBMS reference signal and data.

To realize above method, there is provided a corresponding device. Wherein, according to another aspect of the invention, there is provided a sending device for sending MBMS data based on MBMS cell groups, comprising: a channel coding and modulating means, for channel coding and modulating said MBMS traffic data; a cell group-specific scrambling code determining means, for determining the MBMS cell group-specific scrambling code; a cell-specific scrambling code determining means, for determining the MBMS cell-specific scrambling code; a scrambling means for, with respect to the coded and modulated MBMS traffic data, scrambling said MBMS traffic data with said MBMS cell group-specific scrambling code, and adding reference signal scrambled with said MBMS cell group-specific scrambling code and reference signal scrambled with said MBMS cell-specific scrambling code; and a scrambled data sending means, for sending the scrambled MBMS reference signal and data.

According to another aspect of the invention, there is provided a receiving device for receiving MBMS traffic data based on MBMS cell groups, comprising: a scrambled signal receiving means, for receiving scrambled MBMS reference signal and data; a cell group descrambling code determining means, for determining MBMS cell group-specific scrambling code for descrambling; a cell descrambling code determining means, for determining MBMS cell-specific scrambling code for descrambling; a descrambling means, for descrambling the received MBMS reference signal and data with the determined cell group-specific scrambling code and cell-specific scrambling code; and a channel decoding and demodulating means, for channel decoding and demodulating the descrambled MBMS reference signal and data.

In addition, there is also provided a NodeB comprising said sending device, a user equipment comprising said receiving device and a system comprising said NodeB and said user equipment.

According to another aspect of the invention, there is provided a method, in the user equipment in wireless network which is divided into multiple cell groups, for combining multiple multicast signals received from multiple network nodes, said multiple network nodes respectively belonging to different cell groups, characterized in comprising the following step:

a. coherently combining the multicast signals with the cell group-specific scrambling code of the cell group which said user equipment belongs to, in spatial combining signals of said multiple multicast signals, so as to generate coherent combining signals of the cell group which the user equipment belongs to; noncoherently combining the multicast signals with different scrambling codes in said spatial combining signals, so as to generate symbol combining signals.

According to another aspect of the invention, there is provided a user equipment, in wireless network, for combining multiple multicast signals received from multiple network nodes, wherein, comprising: a coherent combining means, for coherently combining multicast signals with the same scrambling code in the spatial combining signals of said multiple multicast signals, so as to generate coherent combining signals; a symbol combining means, for noncoherently combining the multicast signals with different scrambling codes in said spatial combining signals, so as to generate symbol combining signal.

According to another aspect of the invention, there is provided a method, in wireless network based on MBMS cell groups, for transmitting multicast signals, wherein, each cell group comprises multiple network nodes and the cells they are governing, characterize in that, the network nodes of the same cell group scrambles signals to be sent with the same specific scrambling code.

According to another aspect of the invention, there is provided a wireless network based on MBMS cell group, for transmitting multicast signals, wherein, each cell group comprises multiple network nodes and the cells they are governing, characterized in that, the network nodes of the same cell group scrambles signals to be sent with the same specific scrambling code.

According to another aspect of the invention, there is provided a method, in an access device in wireless network based on MBMS cell groups, for scheduling the time domain resources for multicast traffic, characterized in that, staggering the time domain multiplexing resources when doing TDM processing to unicast and multicast traffic allocated to governed cell group, to ensure only one cell group will transmit multicast traffic at one time.

According to the another aspect of the invention, there is provided an access device, in wireless network based on MBMS cell groups, for scheduling the time domain multiplexing resources for multicast service, characterized in that, staggering the time domain multiplexing resources when doing TDM processing to unicast and multicast traffic allocated to governed cell group to ensure only one cell group to will transmit multicast traffic at one time.

With the methods and the corresponding devices provided by the invention, in an user equipment acting as a receiving end, RF combining (coherent soft combining) could be done to the signals transmitted from E-NodeBs at the inner of cell group, while soft combining (non-coherent soft combining) at symbol level could be done to the signals transmitted from E-NodeBs between different cell groups after FFT processing. Moreover, it is more flexible for synchronization.

BRIEF DESCRIPTION OF THE DRAWINGS

Other features and advantages of the present invention will appear in the following description of non-limiting exemplary embodiments, with reference to the appended drawings.

DETAILED DESCRIPTION OF EMBODIMENTS

Detailed description of the invention is given as below with reference to the appended drawings. It should be noted that, the illustrative steps for realizing the methods and the illustrative structures of the devices shall not be understood as limiting the protection scope of the present invention.

Figure 3:
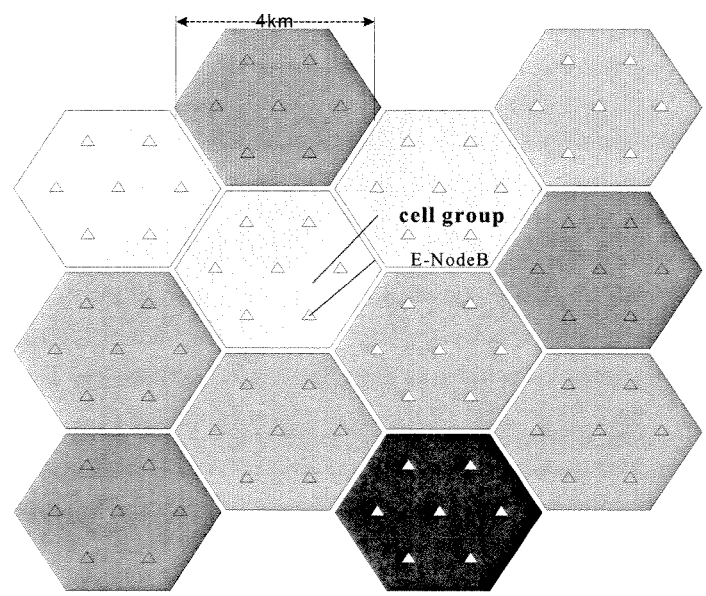
FIG. 3 shows the schematic view of MBMS cell groups division in LTE according to the invention.

For the ease of explanation, FIG. 3 shows the schematic view of MBMS cell groups division in LTE proposed by the applicant. Though here hexagonal cell is taken as a model in the example, MBMS cell group division is not limited to the hexagonal cell.

As seen in FIG. 3, in LTE cell configuration, all cells are divided into multiple MBMS cell groups according to radio propagation delay. Each cell group contains multiple E-nodeBs, which are located in cell group and marked with small triangle, and their cells/sectors. The diameter of cell group coverage is equal to or slightly less than the distance with radio propagation in long CP window, e.g. 4 km, so that when a UE locates at the inner of a cell group, all the signals transmitted from E-NodeBs in this cell group will arrive at the UE within the CP window. In order to do RF combination in UE receiver without any additional operation, the content and waveform of the signals in the CP window must be identical. Therefore, a scheme of scrambling MBMS traffic data with a cell group-specific scrambling code is proposed. The cell group-specific scrambling code is common to all E-NodeBs in one cell group, but specific to different cell groups.

Thereinafter, a method for sending MBMS traffic data according to one embodiment of the invention will be described in details with reference to FIG. 4, wherein, the method of how to scramble MBMS traffic data with cell group-specific scrambling code is explained. In UMTS E-UTRAN based on MBMS cell groups, E-NodeB sends MBMS traffic data to the UE in the cell group.

Figure 4:
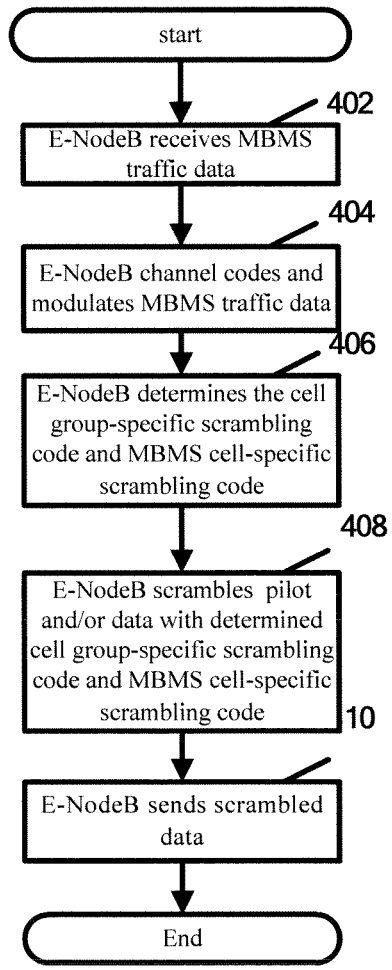
FIG. 4 shows the flow chart of the method for sending MBMS traffic data according to one embodiment of the invention.

As seen in FIG. 4, in step 402, E-NodeB receives MBMS traffic data. In UMTS E-UTRAN, MBMS traffic data usually comes from access gateway (aGW) which is taken as the border node of core network. With respect to said MBMS traffic data, in step 404, E-NodeB channel codes and modulates said MBMS traffic data. In said step, any method of channel coding and modulation in prior arts could be used in this invention, which will not do any restriction to the invention.

Then, in step 406, the E-NodeB, which is going to send MBMS traffic data, determines the cell group-specific scrambling code of the cell group it belonging to and the MBMS cell-specific scrambling code. The cell group-specific scrambling code and the MBMS cell-specific scrambling code could be set in each E-NodeB when the system is configured. According to the embodiment of the invention, each cell group shown in FIG. 3 has its specific scrambling code which is different from those of other cell groups. Each E-NodeB locating in the determined cell group could know the cell group-specific scrambling code of the cell group it belonging to.

Any pseudorandom sequence in existing conventional scrambling code sequences could be used, such as Gold sequence or Kasami sequence.

After determining the cell group-specific scrambling code and MBMS cell-specific scrambling code, in step 408, E-NodeB scrambles the channel coded and modulated MBMS pilot and/or data with determined cell group-specific scrambling code and MBMS cell-specific scrambling code. Specifically, with respect to the channel coded and modulated MBMS data, the E-NodeB scrambles MBMS traffic data with the cell group-specific scrambling code, adds reference signal scrambled with the cell group-specific scrambling code and reference signal scrambled with the cell-specific scrambling code. After the scrambling, there are intervals between the scrambled pilots and the intervals are comparable to the correlated bandwidth and correlated time under condition of considering the validity of data transmission and the influence to channel response estimation.

Then, in step 410, the E-NodeB sends the scrambled MBMS data.

Figure 5:
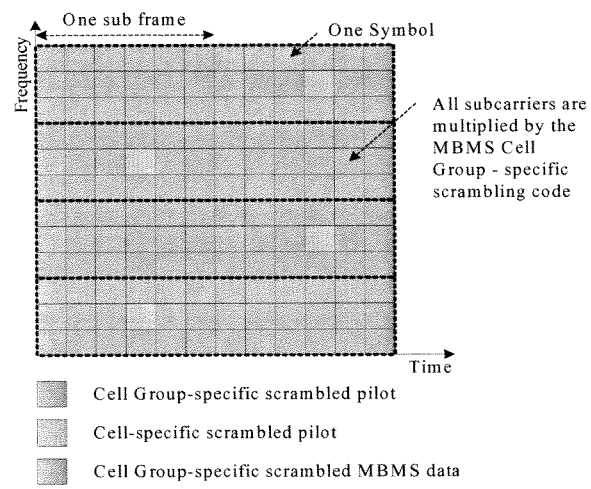
FIG. 5 shows the schematic view of pilot and data structures processed by the method for sending MBMS traffic data according to one embodiment of the invention.

It could be seen from FIG. 4 that pilot and data scrambled with the cell group-specific scrambling code are added into MBMS traffic data processed by the method for sending MBMS traffic data according to one embodiment of the invention, which is different from the method of scrambling pilot and data with cell-specified scrambling code in prior arts. The schematic view of MBMS pilot and data is shown in FIG. 5. Wherein, abscissa represents time domain, ordinate represents frequency domain and each rectangle grid represents a symbol. Six symbols along the abscissa represent a sub frame, and each sub frame lasts for 0.5 ms. Each row arrayed along ordinate corresponds to a sub carrier.

It could be seen that channel structure shown in FIG. 5 comprises pilot scrambled with MBMS cell group-specific scrambling code and pilot scrambled with additional cell-specific scrambling code. In this structure, pilot scrambled with cell-specific scrambling data is used for downlink channel measurement, cell search and initial acquisition. Pilot scrambled with MBMS cell group-specific scrambling code could be used for downlink channel estimation for coherent demodulation and detection at the UE, the measurement of downlink branch power level and handover between cell groups.

Figure 1:
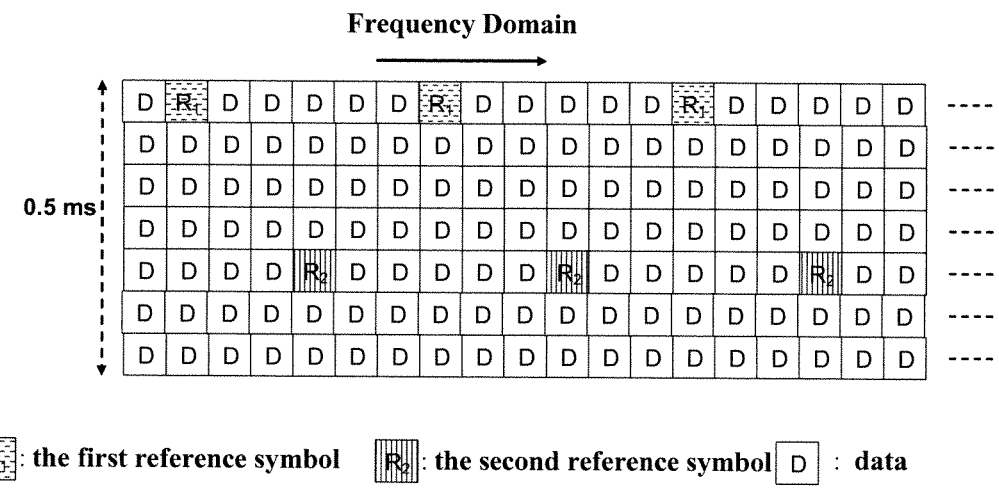
FIG. 1 shows the design of basic reference signal structure after a preliminary discussion in 3GPP LTE.
Figure 2A:
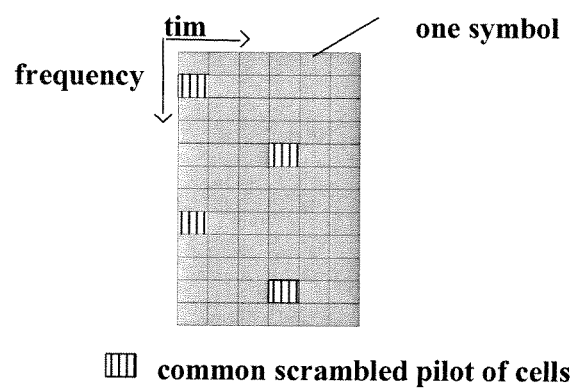
FIG. 2A shows pilot and data structures generated by scrambling pilot with a common scrambling code of cells.
Figure 2B:
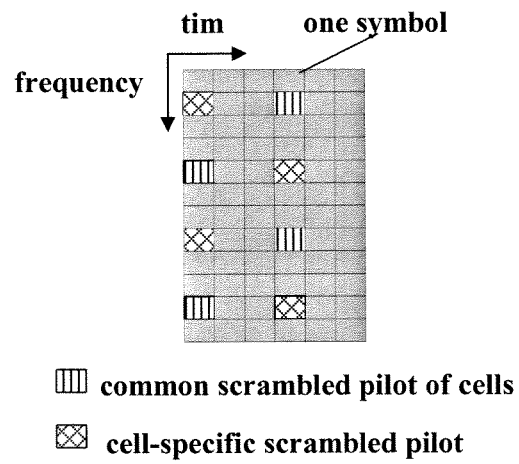
FIG. 2B shows pilot and data structures generated by scrambling pilot with a common scrambling code of cells and cell-specific scrambling code.
Figure 2C:
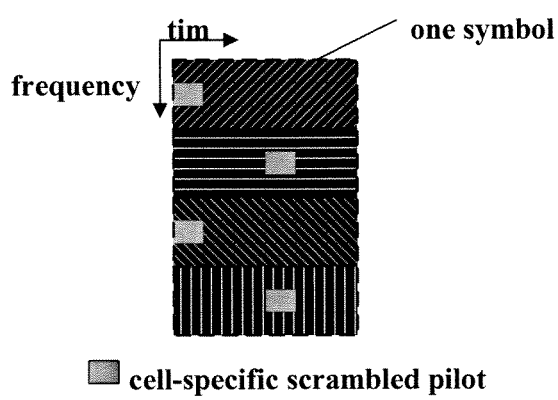
FIG. 2C shows pilot and data structures generated by scrambling pilot and data with cell-specific scrambling code.

With respect to the basic reference signal structure in 3GPP LTE shown in FIG. 1, the E-NodeB scrambles the first reference symbol (pilot) with cell group-specific scrambling code according to the method for sending MBMS traffic data, this corresponds to the intervallic pilots scrambled with cell group-specific scrambling code in FIG. 5. The E-NodeB also scrambles the second reference symbol (pilot) with cell-specific scrambling code, this corresponds to the intervallic pilots scrambled with cell-specific scrambling code in FIG. 5. As to the MBMS data, E-NodeB scrambles them with cell group-specific scrambling code, this corresponds to the rectangles except for the scrambled pilots.

In a cell group, reference signal and data are scrambled with athe same cell group-specific scrambling code, so that pilot and data transmitted from E-NodeBs in the cell group could arrive at UE receiver within CP window and the waveforms of the signals will be identical. Therefore, RF combining could be realized at UE without any additional operation, so that it is quite convenient to obtain diversity gain.

At the boundary of a cell group, since different cell groups utilize different cell group-specific scrambling codes, UE could randomize signals from other cell groups by recognizing scrambling code after receiving data scrambled with specific scrambling codes of other cell groups, so that UE takes signals from other cell groups as random white noise and gets them removed. Moreover, because each UE knows cell group-specific scrambling codes of surrounding cell groups, when a UE moves to the boundary of a cell group, the UE will, after measurement, find the pilot of an interference signal has became strong enough to be a useful combining branch. Therefore, an additional physical layer processing branch is established in UE receiver to receive this signal so that symbols of two branches of signals are soft combined after FFT processing to obtain macro diversity gain.

Furthermore, since noncoherent soft combining is applied after FFT processing, timing difference from two radio links need not to be so tight, e.g. 16.7 us or more. In this way, tight synchronization and resynchronization only need to be implemented between E-NodeBs at the inner of the cell group, but not between E-NodeBs from different cell groups, so that tight synchronization and resynchronization of E-MBMS will be simple and efficient.

As described in the content above, people skilled in this art should understand the invention is not limited to aforesaid cell group division method. It could be applied to any circumstance of dividing multiple cells into different cell groups. Various divisions of cell groups wouldn't do restriction to this invention.

Figure 6:
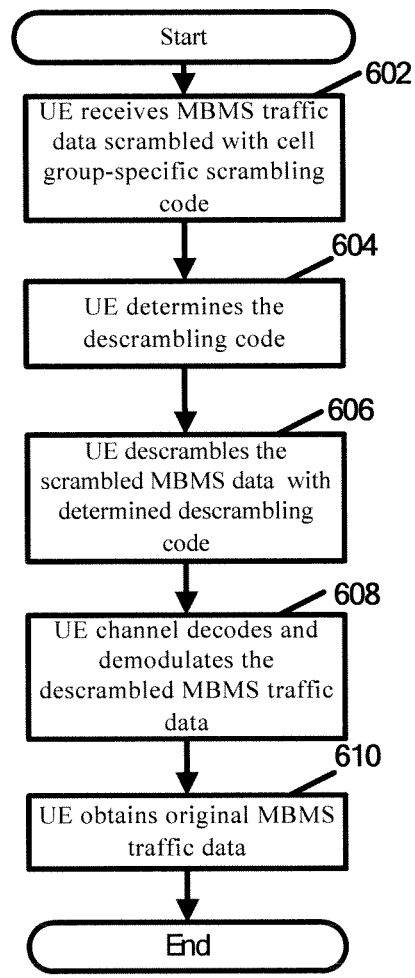
FIG. 6 shows the flow chart of the method for receiving MBMS traffic data according to one embodiment of the invention.

Corresponding to the method for sending MBMS traffic data according to one embodiment of the invention, a method for receiving E-MBMS traffic data is proposed in the invention and its flow chart is shown in FIG. 6. In UMTS E-UTRAN based on MBMS cell groups divided in the aforesaid way, UE receives scrambled E-MBMS traffic data.

As seen in FIG. 6, in step 602, UE receives MBMS traffic data scrambled with cell group-specific scrambling code. When a UE locates at the inner of a MBMS cell group, signals transmitted from all E-NodeBs of the cell group which this UE belongs to will arrive at the UE within CP window. When a UE locates at the boundary of the cell group, UE will receive two or more strong enough scrambled MBMS data, respectively transmitted from the cell group to which the UE belongs and one or more other cell groups nearest to where the UE locates.

Then, in step 604, UE determines the descrambling code. According to the embodiment of the invention, descrambling codes are cell group-specific scrambling code and cell-specific scrambling code. Each cell group shown in FIG. 3 has its specific scrambling code which is different from those of other cell groups. Each UE locating in the determined cell group knows the specific scrambling code of the cell group it belongs to. The cell group-specific scrambling code is determined by cohering cell group scrambling code sequence stored in UE for receiving MBMS traffic data and reference signal and data scrambled with said cell group-specific scrambling code in received scrambled MBMS reference signal and data. When UE locates at the boundary of the cell group, it knows the cell group-specific scrambling code of the cell group it belongs to, which is called the first cell group specific scrambling code, and that of the cell group nearest to where UE locates, which is called the second cell group-specific scrambling code.

In step 606, UE descrambles the scrambled MBMS data received in step 602 with determined descrambling code. Specifically, UE descrambles the cell group-specific scrambled pilot and data with cell group-specific scrambling code, and descrambles the cell-specific scrambled pilot with cell-specific scrambling code. As to the UE at the inner of the cell group, it is easy to utilize the specific scrambling code of the cell group it belongs to do descramble. When UE locates at the boundary of the cell group, it will utilize the determined first cell group-specific scrambling code to descramble the received signals and store the data from its own cell group, and, utilize the determined second cell group-specific scrambling code to descramble the received signals and store the data from the most neighboring cell groups. Said two descrambled signals could be soft combined at symbol level (non-coherent soft combining) at UE receiver after FFT processing.

In step 608, UE channel decodes and demodulates the descrambled MBMS data and then, in step 610, UE obtains MBMS data. Till then, the flow shown in FIG. 6 comes to an end.

Based on aforesaid method for receiving MBMS traffic data according to the invention, whether UE locates at the inner of the cell group or at boundary of the cell group, RF combining or soft combining could be well realized to obtain diversity gain.

Figure 7:
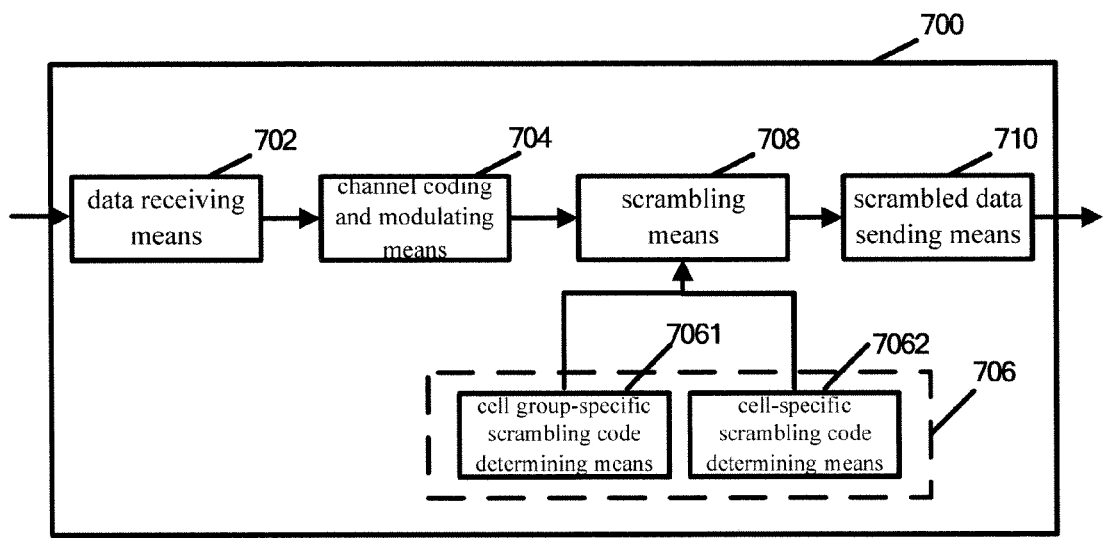
FIG. 7 shows the block diagram of a sending device for sending MBMS traffic data according to one embodiment of the invention.

To realize aforesaid data sending and receiving methods according to the embodiment of the invention, the corresponding devices of the invention is also proposed and they are applied to the circumstance of aforesaid MBMS cell group division. FIG. 7 shows the block diagram of sending device 700 for sending MBMS traffic data according to one embodiment of the invention. The sending device 700 comprises a data receiving means 702, a channel coding and modulating means 704, a scrambling code determining means 706, a scrambling means 708 and a scrambled signal sending means 710. Wherein, said scrambling code determining means 706 comprises a cell group-specific scrambling code determining means 7061 and a cell-specific scrambling code determining means 7062.

Thereafter, link relation and operation relation between each means in sending device 700 will be described in detail with reference to FIG. 7. The data receiving means 702 usually receives MBMS traffic data from access gateway (aGW) which is taken as the border node of core network. The channel coding and modulating means 704 channel codes and modulates said MBMS traffic data. The channel coding and modulating means 704 could use any method of channel coding and modulation in prior arts, which will not do any restriction to the invention.

Then, the cell group-specific scrambling code determining means 7061 determines the cell group-specific scrambling code of the cell group the E-NodeB belongs to and the cell-specific scrambling code determining means 7062 determines the cell-specific scrambling code. The cell group-specific scrambling code and the MBMS cell-specific scrambling code could be set in each E-NodeB when the system is configured. According to the embodiment of the invention, each cell group shown in FIG. 3 has its specific scrambling code which is different from those of other cell groups. Each E-NodeB locating in the determined cell group could know the cell group-specific scrambling code of the cell group it belongs to.

Any pseudorandom sequence in existing conventional scrambling code sequences could be used, such as Gold sequence or Kasami sequence.

After determining cell group-specific scrambling code and MBMS cell-specific scrambling code, the scrambling means 708 scrambles the MBMS data output from the channel coding and modulating means 704 with determined cell group-specific scrambling code and MBMS cell-specific scrambling code. Specifically, with respect to the channel coded and modulated MBMS traffic data, the scrambling means 708 scrambles MBMS traffic data with the cell group-specific scrambling code and adds reference signal scrambled with the cell group-specific scrambling code and reference signal scrambled with the cell-specific scrambling code, so that there are intervals between the scrambled pilots and the intervals are comparable to correlated bandwidth and time under condition of considering the validity of data transmission and the influence to channel response estimation. Then, the scrambled signal sending means 710 sends scrambled MBMS data.

Figure 8:
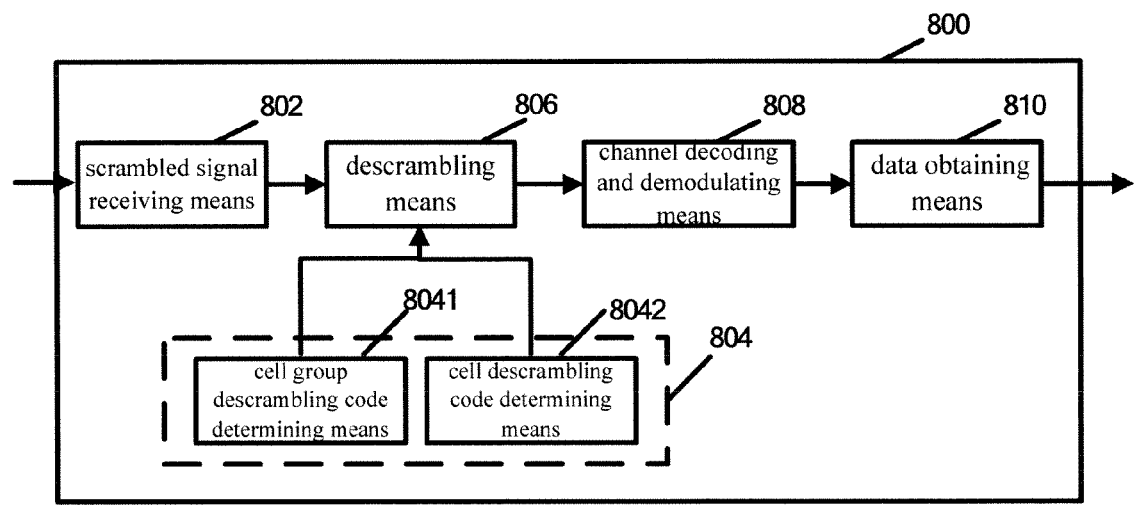
FIG. 8 shows the block diagram of a receiving device for receiving MBMS traffic data according to one embodiment of the invention.

Correspondingly, a data receiving device 800 for receiving MBMS traffic data is proposed and its block diagram is shown in FIG. 8. It could be seen in FIG. 8, data receiving device 800 for receiving MBMS traffic data comprises a scrambled signal receiving means 802, a descrambling code determining means 804, a descrambling means 806, a channel decoding and demodulating means 808 and a data obtaining means 810. Wherein, said descrambling code determining means 804 comprises a cell group descrambling code determining means 8041 and a cell descrambling code determining means 8042.

Thereafter, link relation and operation relation between each means in data receiving device 800 will be described in detail according to FIG. 8. The scrambled signal receiving means 802 receives the scrambled MBMS traffic data. When UE locates at the inner of a MBMS cell group, signals transmitted from all E-NodeBs in the cell group it belongs to will arrive at UE within CP window. When UE locates at the boundary of the cell group, the scrambled signal receiving means 802 will receive two or more strong enough scrambled MBMS data, respectively transmitted from the cell group which the UE belongs to and one or more cell groups nearest to where the UE locates.

Then, the cell group descrambling code determining means 8041 determines the cell group-specific scrambling code which is used for descrambling, and the cell descrambling code determining means 8042 determines the cell-specific scrambling code which is used for descrambling. In the embodiment of the invention, each cell group shown in FIG. 3 has its specific scrambling code which is different from those of other cell groups. Each UE locating in the determined cell group knows the specific scrambling code of the cell group it belongs to. Wherein, the cell group scrambling code determining means 8041 determines the cell group-specific scrambling code by cohering cell group scrambling code sequence stored in UE for receiving MBMS traffic data and reference signal and data scrambled with said cell group-specific scrambling code in received scrambled MBMS reference signal and data. When UE locates at the boundary of the cell group, it knows the cell group-specific scrambling code of the cell group it belongs to, which is called the first cell group specific scrambling code, and that of the cell group nearest to where UE locates, which is called the second cell group-specific scrambling code.

The descrambling means 806 descrambled the scrambled MBMS data with determined descrambling codes. Specifically, the descrambling means 806 descrambles the cell group-specific scrambled reference signal and data with cell group-specific scrambling code and descrambles the cell-specific scrambled reference signal with cell-specific scrambling code. As to the UE at the inner of the cell group, it is easy to utilize the specific scrambling code of the cell group it belonging to do descramble. When UE locates at the boundary of the cell group, it will utilize the determined first cell group-specific scrambling code to descramble the received signals and store the data transmitted from its own cell group, and utilize the determined second cell group-specific scrambling code to descramble the received signals and store the data transmitted from the most neighboring cell groups. Said two descrambled signals could be soft combined at symbol level (non-coherent soft combining) at UE receiver after FFT processing.

The channel decoding and demodulating means 808 channel decodes and demodulates the descrambled MBMS data and then, the data obtaining means 810 obtains MBMS data.

According to aforesaid system comprising a sending device and a receiving device according to the embodiment of the invention, the pilot and the traffic data in E-MBMS are obtained based on MBMS cell group division. A MBMS cell group-specific scrambling code is introduced into the scheme of the invention, so that in the pilot signal structure which is scrambled with MBMS cell group-specific scrambling code, it comprises the pilot scrambled with MBMS cell group-specific scrambling code and additional pilot scrambled with cell-specific scrambling code. MBMS traffic data could also be scrambled with cell group-specific scrambling code. In this way, in the receiver of UE, RF combining (coherent soft combining) could be done to the signals transmitted from E-NodeBs in the cell group, while soft combining (non-coherent soft combining) at symbol level could be done to the signals transmitted from E-NodeBs in different cell groups after FFT processing. As the soft combining is done at symbol level after FFT processing and before Turbo decoding, it is more flexible for synchronization. The tight synchronization and re-synchronization at physical layer only need to be implemented between E-NodeBs in the cell group.

Thereinafter, several concepts need to be explained as follows:

CP Window: A time duration corresponding to the CP of OFDM symbol is called cyclic-prefix (CP). If the signals transmitted from an E-Node arrive at UE within the time duration, it is called the signals arrive within the CP window, and if the signals transmitted from the E-Node arrive at UE out of the time duration, it is called the signals arrive out of CP window.

Cell Group: Several cells in wireless network is defined as a cell group according to the CP length of downlink OFDM signal, more specifically, according to the distance with radio propagation in CP window. The distance is usually the diameter of the cell group or that between two acmes having the longest distance from each other. Characteristically, multicast signals transmitted from all E-NodeBs in a cell group arrive at UE within the CP window, the UE is under the coverage of the cell group.

The cell Group the UE Belongs to: The cell group of which the UE is under coverage is called the cell group the UE belongs to.

Neighboring cell Group(s): The neighboring groups are one or more cell groups which are neighboring the cell group where the UE locates in and the intensities of multicast signals transmitted from the E-NodeB therein reaches to certain level in the cell group where the UE locates in.

RF combining: As to multi-cell MBMS transmission, if there is tight synchronization between cells, that is to say, all signals arrive at UE receiver within CP window defined by CP, UE could combine signals on multiple links without increasing the complexity of the UE receiver. Said combining is called RF combining.

Specific Scrambling Code: There are probably several E-NodeBs in a cell group. Because RF combining will be done to the signals transmitted from these E-NodeBs and the contents and waveforms of these signals need to be identical, these E-NodeBs must use the same scrambling code which is called the cell group-specific scrambling code to scramble signals. Various cell groups utilize different specific scrambling codes.

Symbol Combining: As to the signals transmitted from the E-NodeBs in neighboring cell group, the signals arriving out of the CP window are selectively combined, that is to say, when the intensities of these signals reaches to the extent which could interact, the specific scrambling codes respectively corresponding to each neighboring cell group is used to descramble the data which belongs to the neighboring group. The process of combining descrambled data of all cell groups is called symbol combining.

Figure 9:
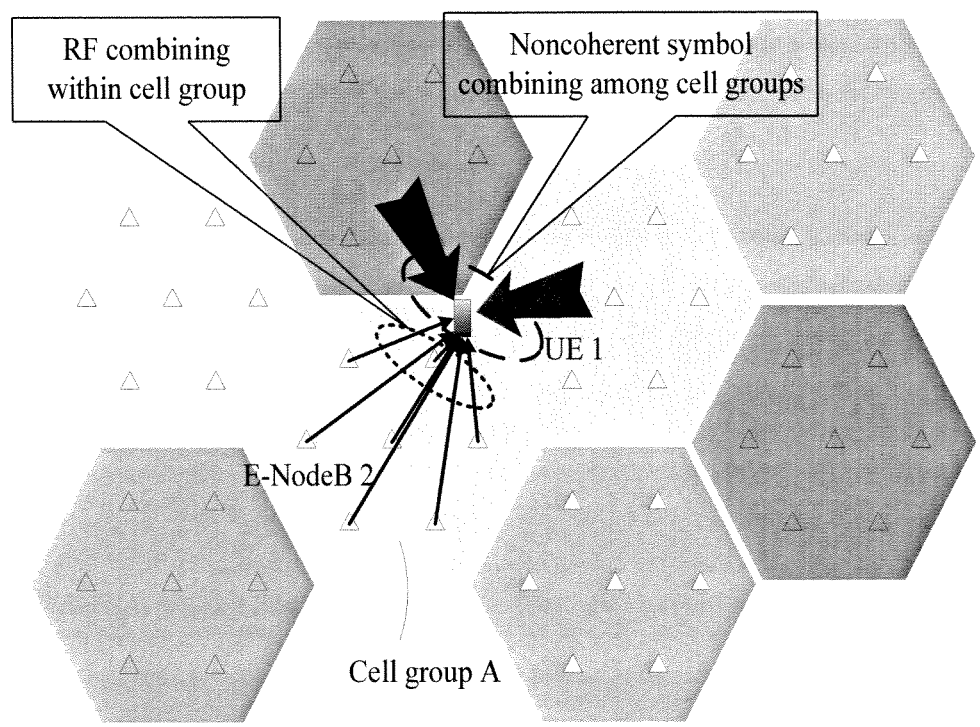
FIG. 9 shows the schematic view of a wireless network which is divided into multicast cell groups according to one embodiment of the invention.

FIG. 9 shows the schematic view of the wireless network which is divided into multiple multicast cell groups according to one embodiment of the invention. Wherein, the wireless network comprises multiple cell groups and each cell group comprises multiple E-NodeBs, also, there is a UE 1. For the simplicity, only one cell group A and one E-NodeB 2 are shown in FIG. 9. Wherein, the cell group division is based on the radio propagation delay and a CP window. The diameter of the cell group is equal to the distance with radio propagation in long CP window.

A path corresponding to simple radio propagation delay which equals to the CP window length is calculated as:

$$3 \times 10^8 \text{ m/s} \times 16.7 \times 10^{-6} \text{ s} \approx 5 \text{ km}$$

If considering multipath delay in bad urban environment, the corresponding distance is calculated as:

$$3 \times 10^8 \text{ m/s} \times (16.7 \times 10^{-6} \text{ s} - 6.6 \times 10^{-6} \text{ s}) \approx 3 \text{ km}$$

Therefore, in bad urban environment, the bound of MBMS cell group may be set to 3~14 km. The distance between two acmes having longest distance is set to 4 km according to the division of hexagons shown in FIG. 1. In this way, it is guaranteed that the time of the data transmitted from all E-NodeBs including E-NodeB 2 in a cell group, i.e. the cell group A, arriving at a UE, i.e. UE 1, is less than or equal to the CP window length, that is to say, the corresponding signals arrive within the CP window.

According to the basic configuration of inter-site distance in LTE, i.e. 500 m or 1732 m, seven neighboring E-NodeBs could be divided as a MBMS cell group for inter-site distance of 1732 m, while nineteen neighboring E-NodeBs could be divided as a MBMS cell group for inter-site distance of 500 m.

Even in another typical urban environment of COST 207 model with 0~2.4 µs time delay spread, the bound of MBMS cell group could be set to 4~5 km. In this way, nineteen neighboring E-NodeBs could be divided as a MBMS cell group for inter-site distance of 1732 m, while thirty-seven neighboring E-NodeBs could be divided as a MBMS cell group for inter-site distance of 500 m.

The configuration of a typical MBMS cell group division is shown in table 1 as follows:

TABLE 1

|  | bad urban environment (BU) | | typical urban environment (TU) | |
| --- | --- | --- | --- | --- |
| The bound of MBMS cell group | 3~4 km | | 4~5 km | |
| inter-site distance | 1732 m | 500 m | 1732 m | 500 m |
| the number of E-nodeBs | 7 | 19 | 19 | 37 |

When UE 1 locates at the center of the cell group, as the intensities of the signals from E-NodeBs in other cell groups are lower, there is no need to do symbol combining to this part of signals.

Figure 10:
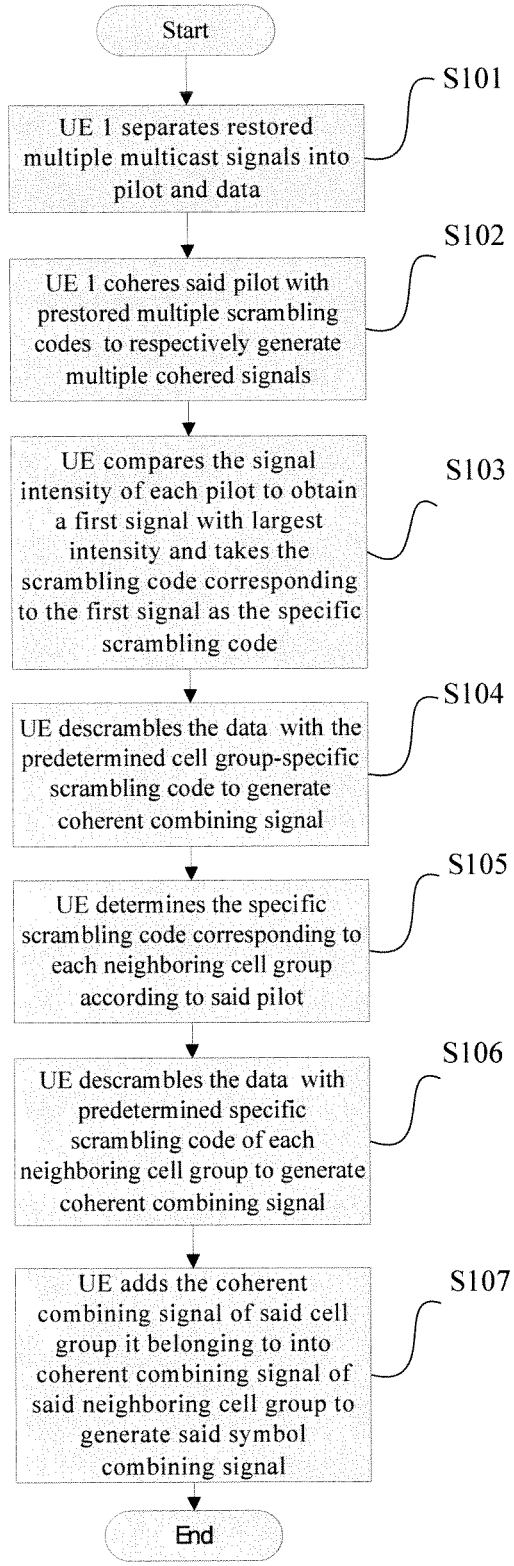
FIG. 10 shows the flow chart of the method, in the user equipment in wireless network which is divided into multicast cell groups, for combining multiple multicast signals received from multiple NodeBs.

FIG. 10 shows the flow chart of the method, in the user equipment in wireless network which is divided into multiple cell groups, for combining multiple multicast signals received from multiple E-NodeBs. Thereinafter, a detailed description will be made to this method, with reference to FIG. 10 in conjunction with FIG. 9. Said method starts from the step S101.

In step S101, UE 1 separates retrieved multiple multicast signals into pilot and data. For the simplicity, the step of retrieved processing is not shown in FIG. 10. In one embodiment of the invention, said retrieving processing comprises: analog/digital conversion-FFT (Fast Fourier Transform)-sub frame collection and etc.

After separating retrieved multiple multicast signals into pilot and data, there goes into step S102.

In step S102, UE 1 coheres said pilot with prestored multiple scrambling codes, saying, specific scrambling codes of cell group A and its neighboring cell groups, so as to respectively generate multiple cohered signals, and then there goes into step S103.

Step S103: the signal intensity of pilot from cell group A is usually larger than those from neighboring cell groups. Furthermore, pilot of each E-NodeB is descrambled and cohered with the same scrambling code (the specific scrambling code of cell group A) before each E-NodeB sends pilots, the contents and waveforms of pilots from each E-NodeB in cell group A are identical, and then there exists RF combining. Signals overlap in spatial area and the intensities are increasing, therefore, the signal intensity of pilots from E-NodeBs in cell group A is obviously larger than that of pilots from neighboring groups. Therefore, UE compares the signal intensity of each pilot to obtain a first signal with largest intensity. Obviously, the first signal is aforesaid pilot from E-NodeB in cell group A. The scrambling code corresponding to the first signal is used as the specific scrambling code of the cell group the UE belongs to which is used in the step of descrambling.

In step S104, UE descrambles the data (comprising multiple data separated from the signals transmitted from E-NodeB in cell group A and its neighboring cell group) with the predetermined specific scrambling code of cell group A. Since the specific scrambling code of each cell group is specific, it is easily to understand that the scrambling code for descrambling is the specific scrambling code of cell group A, data signals from the neighboring cell group(s) are randomized into white noise after being descrambled with the specific scrambling code and then filtered by filter. The remaining signals are data integration from E-NodeB in cell group A, that is to say, the coherent combining signal of the cell group UE belongs to. Then, there goes into step S105.

In step S105, UE determines the specific scrambling code corresponding to each neighboring cell group according to said pilot. Then, there goes into step S106.

In step S106, UE descrambles the data (comprising data separated from the signals from cell group A and its neighboring cell group) with predetermined specific scrambling code of each neighboring cell group. The number of descrambling processing corresponds to the number of neighboring cell groups, and the specific scrambling code of a neighboring cell group is utilized to descramble data in each descrambling processing. As described in the content above, after descrambling, signals from the E-NodeB in the cell group which corresponds to the specific scrambling code for descrambling are descrambled successfully, while the signals transmitted from E-NodeBs in other cell groups (including cell group A) are randomized into white noise and filtered. After descrambling, the coherent combining signal of neighboring cell group is generated. Then, there goes into step S107.

In step S107, UE adds the coherent combining signal of said cell group it belongs to into coherent combining signal of said neighboring cell group to generate said symbol combining signal.

Figure 11:
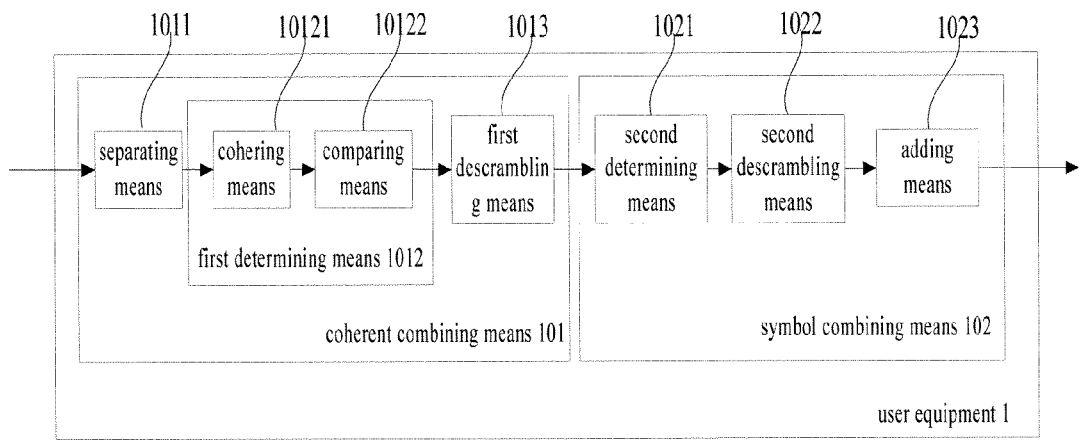
FIG. 11 shows the block diagram of the user equipment, in wireless network which is divided into multicast cell groups, for combining multiple multicast signals received from multiple network nodes.

FIG. 11 shows the block diagram of the user equipment, in wireless network which is divided into multiple cell groups, for combining multiple multicast signals received from multiple E-NodeBs. Thereinafter, a detailed description is made to the user equipment with reference to FIG. 11 and in conjunction with FIG. 9. The user equipment 1 (UE 1) comprises a coherent combining means 101 and a symbol combining means 102. Wherein, the coherent combining means 101 comprises a separating means 1011, a first determining means 1012 and a first descrambling means 1013. The first determining means 1012 further comprises a cohering means 10121 and a comparing means 10122. The symbol combining means 102 comprises a second determining means 1021, a second descrambling means 1022 and an adding means 1023.

Specifically, the separating means 1011 separates restored multiple multicast signals into pilot and data. For the simplicity, the means of retrieving processing is not shown in FIG. 10. In one embodiment of the invention, said retrieving processing comprises: analog/digital conversion-FFT (Fast Fourier Transform)-sub frame collection and etc.

After separating restored multiple multicast signals into pilot and data, the separating means 1011 transfers the pilot and data to the cohering means 10121.

The cohering means 10121 coheres said pilot with prestored multiple scrambling codes which correspond to specific scrambling codes of cell group A and its neighboring cell groups to respectively generate multiple cohered signals which are then transferred to the comparing means 10122.

The signal intensity of pilot from cell group A is usually larger than those from neighboring cell groups. Furthermore, pilot of each E-NodeB is descrambled and cohered with the same scrambling code (the specific scrambling code of cell group A) before each E-NodeB sends pilots and hence the contents and waveforms of pilots from each E-NodeB in cell group A are identical, and then there exists RF combining. Signals overlap in spatial area and the intensities are increasing, therefore, the signal intensity of pilot from E-NodeBs in cell group A is obviously larger than those from neighboring cell groups. Therefore, the comparing means 10122 compares the signal intensity of each pilot to obtain a first signal with largest intensity. Obviously, the first signal is aforesaid pilot from E-nodeB in cell group A. The scrambling code corresponding to the first signal is used as the specific scrambling code of the cell group the UE belonging to which is used for descrambling.

The first descrambling means 1013 descrambles the data (comprising multiple branches of data separated from the signals transmitted from E-NodeB in cell group A and its neighboring cell group) with the predetermined specific scrambling code of cell group A. Since the specific scrambling code of each cell group is different and it is easily understood that the scrambling code for descrambling is the specific scrambling code of cell group A, data from the neighboring cell group are randomized into white noise after descrambled with the specific scrambling code and then filtered by filter. The remaining signals are data integration from E-NodeB in cell group A, that is to say, the coherent combining signal of the cell group UE belonging to.

The second determining means 1021 determines the specific scrambling code corresponding to each neighboring cell group according to pilot separated by the separating means 1011 and sends it to the second descrambling means 1022.

The second descrambling means 1022 descrambles the data (comprising data separated from the signals from cell group A and its neighboring cell group) with predetermined specific scrambling code of each neighboring cell group determined by the second determined means 1021. The number of descrambling processing corresponds to the number of neighboring cell groups, and the specific scrambling code of a neighboring cell group is utilized to descramble data in each descrambling processing. As described upon, after descrambling, signals from the E-NodeB in the cell group which corresponds to the specific scrambling code for descrambling are descrambled successfully, while the signals transmitted from E-NodeBs in other cell groups (including cell group A) are randomized into white noise and filtered. After descrambling, the coherent combining signal of neighboring cell group is generated. Then, the second descrambling means 1022 transfers the coherent combining signal of each cell group to the adding means 1023.

The adding means 1023 adds coherent combining signal of said cell group it belonging to into coherent combining signal of said neighboring cell group to generate said symbol combing signal.

Usually, non-coherent symbol combining could obtain additional macro diversity gain, but bring additional receiving complexity to UE receiver.

Figure 12:
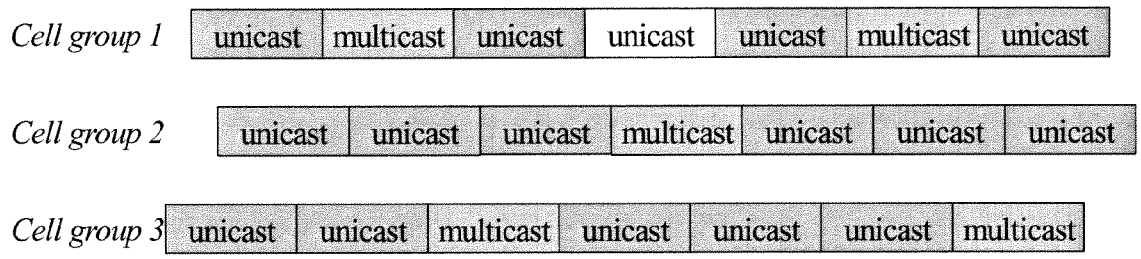
FIG. 12 shows the flow chart of the method for staggering the time domain multiplexing resources for unicast and multicast traffic.

FIG. 12 shows the flow chart of the method for staggering the time domain multiplexing resources for unicast and multicast traffic according to one embodiment of the invention.

Because the content of unicast service of each cell is different, these unicast interference signals arriving at the UE receiver are non-coherent. In this way, inter-cell interference caused by unicast service of other cell groups would be weakened to meet the requirement of SNR even without non-coherent combining.

The staggering time domain multiplexing (TDM) resources for unicast service and multicast service could be implemented by Layer 2 scheduling. This Layer 2 scheduling may be a fixed mode configured by the access gateway (aGW). For example, a prearranged TDM patent is distributed from aGW to each E-NodeB and the beginning time of multicast service in each cell group is staggered already.

Furthermore, since non-coherent combining is applied after FFT processing, the timing difference from two radio links need not be so tight, e.g. 16.7 μs or less. The synchronization just depends on the UE capability, and therefore the physical layer synchronization also need not be considered between E-NodeBs in cell groups.

Figure 13:
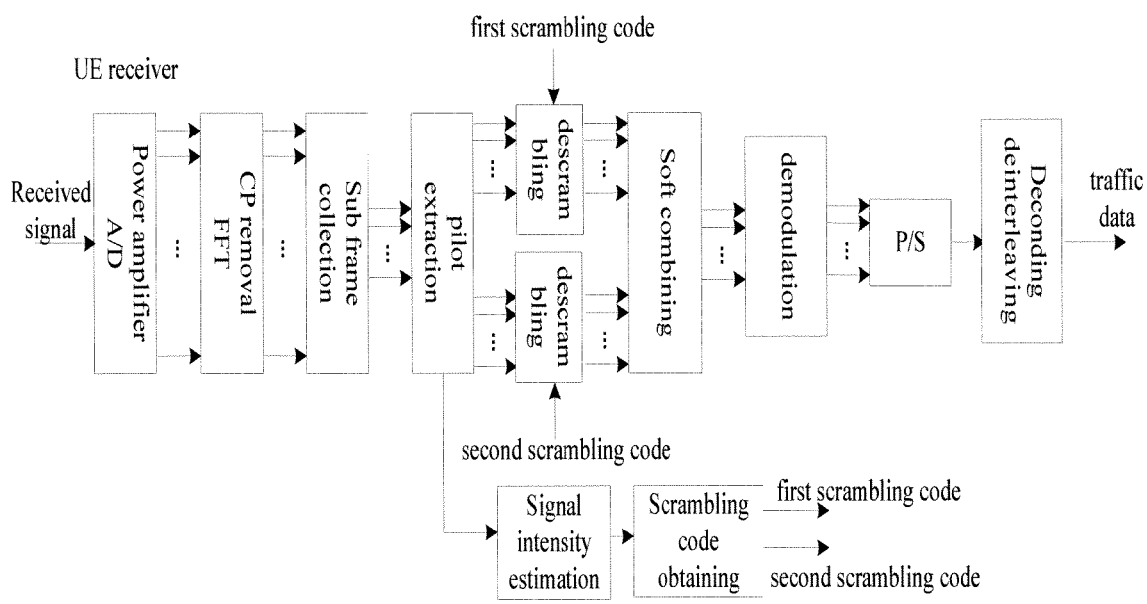
FIG. 13 shows the flow chart of the method for combining multicast signals, wherein, the multicast signals are OFDM signal.

FIG. 13 shows the flow chart of the method for combining multicast signal which uses OFDM signal according to one embodiment of the invention. Thereinafter, a detailed description will be made to this method with reference to FIG. 13 and in conjunction with FIG. 9.

In FIG. 13, signals transmitted from NodeBs in cell group A and each neighboring cell group is processed by A/D converter.

CP removal processing is done to the signals which are processed by A/D converter.

After sub-frame collection and separating processing to signals, the separated scrambling code is used to obtain specific scrambling code of each cell group.

Data from cell group A and each neighboring cell group are descrambled with obtained specific scrambling code.

Symbol combining (RF combining) is done to the descrambled data and then processed by P/S converter.

The final MBMS traffic data is obtained through decoding and deinterleaving processing.

Those who skilled in this art should understand that the invention is not limited to MBMS system of 3GPP LTE, but could be applied to all broadcast and multicast system with OFDM as downlink transmission technology.

Although the embodiments of the present invention have been described above, it is understandable by those skilled in the art that various modifications can be made without departing from the scope and spirit of the scope of the attached claims.

What is claimed is:

1. A method for sending MBMS traffic data, comprising:
channel coding and modulating MBMS traffic data for transmission from a sending device in a wireless network having a network coverage area formed by a plurality of cells, wherein the network coverage area includes a plurality of MBMS cell groups, each MBMS cell group having a corresponding group coverage area and formed by dividing at least a portion of the plurality of cells into groups based on radio propagation time delay over the corresponding group coverage area;
determining an MBMS cell group-specific scrambling code for a specific MBMS cell group;
determining an MBMS cell-specific scrambling code for a specific cell of the specific MBMS cell group;
with respect to the channel coded and modulated MBMS traffic data, scrambling said MBMS traffic data with said MBMS cell group-specific scrambling code, scrambling a first reference signal with said MBMS cell group-specific scrambling code, scrambling a second reference signal with said MBMS cell-specific scrambling code, and adding the scrambled MBMS traffic data and the first and second scrambled reference signals to form a scrambled MBMS reference signal and data; and
sending the scrambled MBMS reference signal and data;
wherein diameters for group coverage areas are equal to or slightly less than a distance with radio propagation in a long CP window according to radio propagation time delay for the corresponding MBMS cell group.

2. The method according to claim 1, wherein, the specific MBMS cell group
for which the MBMS cell group-specific scrambling code is determined includes an E-NodeB from which the scrambled MBMS reference signal and data is sent.

3. The method according to claim 1 wherein, each MBMS cell group is associated with a corresponding MBMS cell group-specific scrambling code that is different from those of other MBMS cell groups.

4. The method according to claim 1, wherein, said MBMS cell group-specific scrambling code is determined using a pseudorandom sequence.

5. The method according to claim 1, comprising:
receiving said MBMS traffic data from an access gateway that includes a border node of a core network.

6. A method for receiving MBMS traffic data, comprising:
receiving a scrambled MBMS reference signal and data at a receiving device from a specific MBMS cell group in a wireless network having a network coverage area formed by a plurality of cells, wherein the network coverage area includes a plurality of MBMS cell groups, each MBMS cell group having a corresponding group coverage area and formed by dividing at least a portion of the plurality of cells into groups based on radio propagation time delay over the corresponding group coverage area;
determining an MBMS cell group-specific descrambling code associated with the specific MBMS cell group for use in descrambling the scrambled MBMS reference signal and data;
determining an MBMS cell-specific descrambling code associated with a specific cell of the specific MBMS cell group for use in descrambling the scrambled MBMS reference signal and data;
descrambling said scrambled MBMS reference signal and data using the MBMS cell group-specific and MBMS cell-specific descrambling codes to obtain channel coded and modulated MBMS traffic data; and
channel decoding and demodulating the channel coded and modulated MBMS traffic data;
wherein, diameters for group coverage areas are equal to or slightly less than a distance with radio propagation in a long CP window according to radio propagation time delay for the corresponding MBMS cell group.

7. The method according to claim 6, wherein, the scrambled MBMS reference signal and data includes channel coded and modulated MBMS traffic data scrambled using an MBMS cell group-specific scrambling code, a first reference signal scrambled using the MBMS cell group-specific scrambling code, and a second reference signal scrambled using an MBMS cell-specific scrambling code, further comprising:
determining said MBMS cell group-specific descrambling code by cohering a cell group scrambling code sequence stored in the receiving device with said MBMS cell group-specific scrambling code used to scramble the channel coded and modulated MBMS traffic data in the scrambled MBMS reference signal and data received by the receiving device.

8. A sending device for sending MBMS traffic, comprising:
a coding and modulating processor configured to channel code and modulate MBMS traffic data for transmission in a wireless network having a network coverage area formed by a plurality of cells, wherein the network coverage area includes a plurality of MBMS cell groups, each MBMS cell group having a corresponding group coverage area and formed by dividing at least a portion of the plurality of cells into groups based on radio propagation time delay over the corresponding group coverage area;
a scrambling code processor configured to determine an MBMS cell group-specific scrambling code for a specific MBMS cell group and to determine an MBMS cell-specific scrambling code for a specific cell of the specific MBMS cell group;
a scrambling processor configured, with respect to the coded and modulated MBMS traffic data, to scramble the MBMS traffic data with said MBMS cell group-specific scrambling code, to scramble a first reference signal with said MBMS cell group-specific scrambling code, to scramble a second reference signal with said MBMS cell-specific scrambling code, and to add the scrambled MBMS traffic and the first and second scrambled reference signals to form a scrambled MBMS reference signal and data; and
a transmitter configured to send the scrambled MBMS reference signal and data;
wherein, diameters for group coverage areas are equal to or slightly less than a distance with radio propagation in a long CP window according to radio propagation time delay for the corresponding MBMS cell group.

9. The sending device according to claim 8, wherein the sending device includes an E-NodeB comprising the coding and modulating processor, the scrambling code processor, the scrambling processor, and the transmitter, wherein the scrambling code processor is configured to determine the MBMS cell group-specific scrambling code according to the MBMS cell group to which the E-NodeB belongs.

10. The sending device according to claim 8, further comprising:
a receiver configured to receive said MBMS traffic data from an access gateway that includes a border node of core network.

11. A receiving device for receiving MBMS traffic data, comprising:
a receiver configured to receive a scrambled MBMS reference signal and data from a specific MBMS cell group in a wireless network having a network coverage area formed by a plurality of cell, wherein the network coverage area includes a plurality of MBMS cell groups, each MBMS cell group having a corresponding group coverage area and formed by dividing at least a portion of the plurality of cells into groups based on radio propagation time delay over the corresponding group coverage area;
at least one processor configured to determine an MBMS cell group-specific descrambling code associated with the specific MBMS cell group for use in descrambling the scrambled MBMS reference signal and data and to determine an MBMS cell-specific descrambling code which is used for descrambling the scrambled MBMS reference signal and data;
wherein the at least one processor is configured to descramble the scrambled MBMS reference signal and data using the MBMS cell group-specific descrambling code and the MBMS cell-specific descrambling code to obtain channel coded and modulated MBMS traffic data;
wherein the at least one processor is configured to channel decode and demodulate the channel coded and modulated MBMS traffic data;
wherein diameters for group coverage areas are equal to or slightly less than a distance with radio propagation in a long CP window according to radio propagation time delay for the corresponding MBMS cell group.

12. The receiving device according to claim 11, wherein the scrambled MBMS reference signal and data includes channel coded and modulated MBMS traffic data scrambled using an MBMS cell group-specific scrambling code, a first reference signal scrambled using the MBMS cell group-specific scrambling code, and a second reference signal scrambled using an MBMS cell-specific scrambling code;

wherein the at least one processor is configured to determine the MBMS cell group-specific scrambling code by cohering a cell group scrambling code sequence stored in the receiving device with said MBMS cell group-specific scrambling code used to scramble the channel coded and modulated MBMS traffic data in the scrambled MBMS reference signal and data received by the receiver.

13. An MBMS data transmission system using OFDM downlink transmissions, comprising a sending device in a wireless network having a network coverage area formed by a plurality of cells, wherein the network coverage area includes a plurality of MBMS cell groups, each MBMS cell group having a corresponding group coverage area and formed by dividing at least a portion of the plurality of cells into groups based on radio propagation time delay over the corresponding group coverage area, the sending device comprising:

a coding and modulating processor configured to channel code and modulate MBMS traffic data;

a scrambling code processor configured to determine an MBMS cell group-specific scrambling code for a specific MBMS cell group and to determine an MBMS cell-specific scrambling code for a specific cell of the specific MBMS cell group;

a scrambling processor configured, with respect to the coded and modulated MBMS traffic data, to scramble the MBMS traffic data with said MBMS cell group-specific scrambling code, to scramble a first reference signal with said MBMS cell group-specific scrambling code, to scramble a second reference signal with said MBMS cell-specific scrambling code, and to add the scrambled MBMS traffic and the first and second scrambled reference signals to form a scrambled MBMS reference signal and data; and a transmitter configured to send the scrambled MBMS reference signal and data; and a receiving device in operative communication with the sending device, the receiving device comprising:

a receiver configured to receive the scrambled MBMS reference signal and data;

a descrambling code processor configured to determine an MBMS cell group-specific descrambling code associated with the specific MBMS cell group for use in descrambling the scrambled MBMS reference signal and data and to determine an MBMS cell-specific descrambling code which is used for descrambling the scrambled MBMS reference signal and data;

a descrambling processor configured to descramble the scrambled MBMS reference signal and data using the MBMS cell group-specific descrambling code and the MBMS cell-specific descrambling code to obtain channel coded and modulated MBMS traffic data; and a decoding and demodulating processor configured to channel decode and demodulate the channel coded and modulated MBMS traffic data;

wherein diameters for group coverage areas are equal to or slightly less than a distance with radio propagation in a long CP window according to radio propagation time delay for the corresponding MBMS cell group.

14. A method for receiving multicast traffic data, comprising:

receiving multiple multicast signals at a receiving device from corresponding multiple network nodes of a wireless network, the wireless network having a network coverage area formed by a plurality of cells defined by a corresponding plurality of network nodes, wherein the network coverage area includes a plurality of cell groups, each cell group having a corresponding group coverage area and formed by dividing at least a portion of the plurality of cells into groups based on radio propagation time delay over the corresponding group coverage area, said multiple network nodes belonging to two or more cell groups;

separating the multiple multicast signals into corresponding multiple pilot signals and multiple multicast traffic data;

determining at least a first cell group-specific scrambling code based at least in part on the multiple pilot signals, the first cell group-specific scrambling code being associated with a first cell group, the receiving device being under coverage of the first cell group; and coherently combining the multicast traffic data of the multiple multicast signals using the first cell group-specific scrambling code to generate a first coherent combining signal for the first cell group;

wherein diameters for group coverage areas are equal to or slightly less than a distance with radio propagation in a long CP window according to radio propagation time delay for the corresponding cell group.

15. The method according to claim 14, further comprising:

descrambling the multiple multicast traffic data using the first cell group-specific scrambling code to generate the first coherent combining signal for the first cell group.

16. The method according to claim 14, further comprising:

obtaining a first pilot signal with a largest intensity from the multiple pilot signals by comparing intensities of said multiple pilot signals; and cohering the first pilot signal to the first cell group-specific scrambling code in conjunction with determining the first cell group-specific scrambling code, wherein the first cell group-specific scrambling code is one of multiple pre-stored cell group-specific scrambling codes.

17. The method according to claim 14, further comprising:

determining at least one neighboring cell group-specific scrambling code based at least in part on the multiple pilot signals, each neighboring cell group-specific scrambling code being associated with a corresponding neighboring cell group of the first cell group; and coherently combining the multicast traffic data of the multiple multicast signals using each neighboring cell group-specific scrambling code to generate corresponding neighboring coherent combining signals for each neighboring cell group from which multicast signals were received by the receiving device.

18. The method according to claim 17, further comprising:

descrambling the multiple multicast traffic data using each neighboring cell group-specific scrambling code to generate the corresponding neighboring coherent combining signals for each neighboring cell group from which multicast signals were received by the receiving device.

19. The method according to claim 14 wherein said multiple multicast signals include OFDM signals, the method further comprising:

demodulating the OFDM signals.

20. A receiving device for receiving multicast traffic data, comprising:

a receiver configured to receive multiple multicast signals from corresponding multiple network nodes of a wireless network, the wireless network having a network coverage area formed by a plurality of cells defined by a corresponding plurality of network nodes, wherein the network coverage area includes a plurality of cell groups, each cell group having a corresponding group coverage area and formed by dividing at least a portion of the plurality of cells into groups based on radio propagation time delay over the corresponding group coverage area, said multiple network nodes belonging to two or more cell groups;
   a multicast signal processor configured to separate the multiple multicast signals into corresponding multiple pilot signals and multiple multicast traffic data;
   a descrambling code processor configured to determine at least a first cell group-specific scrambling code based at least in part on the multiple pilot signals, the first cell group-specific scrambling code being associated with a first cell group, the receiving device being under coverage of the first cell group; and
   a coherent combining processor configured to coherently combine multicast traffic data of the multiple multicast signals user the first cell group-specific scrambling code to generate a first coherent combining signal for the first cell group;
   wherein diameters for group coverage areas are equal to or slightly less than a distance with radio propagation in a long CP window according to radio propagation time delay for the corresponding cell group.

21. The receiving device according to claim 20, further comprising:
   a descrambling processor configured to descramble the multiple multicast traffic data using the first cell group-specific scrambling code to generate the first coherent combining signal for the first cell group.

22. The receiving device according to claim 20
   wherein the descramblinq code processor is configured to obtain a first pilot signal with a largest intensity from the multiple pilot signals by comparing intensities of said multiple pilot signals and to cohere the first pilot signal to the first cell group-specific scrambling code in conjunction with determining the first cell group-specific scrambling code, wherein the first cell group-specific scrambling code is one of multiple pre-stored cell group-specific scrambling codes.

23. The receiving device according to claim 20 wherein the descrambling code processor is configured to determine at least one neighboring cell group-specific scrambling code based at least in part on the multiple pilot signals, each neighboring cell group-specific scrambling code being associated with a corresponding neighboring cell group of the first cell group;
   wherein the coherent combining processor is configured to coherently combine the multicast traffic data of the multiple multicast signals using each neighboring cell group-specific scrambling code to generate corresponding neighboring coherent combining signals for each neighboring cell group from which multicast signals were received by the receiver.

24. The receiving device according to claim 23, further comprising:
   a descrambling processor configured to descramble the multiple multicast traffic data using each neighboring cell group-specific scrambling code to generate the corresponding neighboring coherent combining signals for each neighboring cell group from which multicast signals were received by the receiver.

25. The receiving device according to claim 20 wherein the multiple multicast signals include OFDM signals, the receiving device further comprising:
   a demodulating processor configured to demodulate the OFDM signals.

26. A method for transmitting multicast traffic data, comprising:
   preparing multicast traffic data for transmission from multiple network nodes in a wireless network having a network coverage area formed by a plurality of cells defined by a corresponding plurality of network nodes, wherein the network coverage area includes a plurality of cell groups, each cell group having a corresponding group coverage area and formed by dividing at least a portion of the plurality of cells into groups based on radio propagation time delay over the corresponding group coverage area, the multiple network nodes belonging to a specific cell group;
   scrambling the multicast traffic data at the multiple network nodes of the specific cell group using a cell group-specific scrambling code associated with the specific cell group and different from cell group-specific scrambling codes associated with other cell groups; and
   transmitting the scrambled multicast data from the multiple network nodes of the specific cell group;
   wherein diameters for group coverage areas are equal to or slightly less than a distance with radio propagation in a long CP window according to radio propagation time delay for the corresponding cell group;
   wherein the multicast signals are transmitted from the multiple network nodes of the specific cell group to arrive at a receiving device under coverage of the specific cell group within the long CP window for the specific cell group.

27. A wireless network for transmitting multicast traffic data, comprising:
   multiple network nodes in a wireless network having a network coverage area formed by a plurality of cells defined by a corresponding plurality of network nodes, wherein the network coverage area includes a plurality of cell groups, each cell group having a corresponding group coverage area and formed by dividing at least a portion of the plurality of cells into groups based on radio propagation time delay over the corresponding group coverage area, the multiple network nodes belonging to a specific cell group, each of the multiple network nodes comprising:
      a multicast signal processor configured to prepare multicast traffic data for transmission from the corresponding multiple network node;
      a scrambling processor configured to scramble the multicast traffic data at the corresponding multiple network node of the specific cell group using a cell group-specific scrambling code associated with the specific cell group and different from cell group-specific scrambling codes associated with other cell groups; and
      a transmitter configured to transmit the scrambled multicast data from the corresponding multiple network node of the specific cell group;
   wherein diameters for group coverage areas are equal to or slightly less than a distance with radio propagation in a long CP window according to radio propagation time delay for the corresponding cell group;
   wherein the transmitters of the multiple network nodes are configured to transmit the scrambled multicast signals to arrive at a receiving device under coverage of the specific cell group within the long CP window for the specific cell group.

28. The method according to claim 1 wherein the scrambled MBMS reference signal and data is sent to arrive at the specific MBMS cell group within the long CP window for the specific MBMS cell group.

29. The method according to claim 6 wherein the scrambled MBMS reference signal and data arrives at the receiving device within the long CP window for the specific MBMS cell group.

30. The sending device according to claim 8 wherein the transmitter is configured to send the scrambled MBMS reference signal to arrive at the specific MBMS cell group within the long CP window for the specific MBMS cell group.

31. The receiving device according to claim 11 wherein the scrambled MBMS reference signal and data arrives at the receiver within the long CP window for the specific MBMS cell group.

32. The MBMS data transmission system according to claim 13 wherein the transmitter is configured to send the scrambled MBMS reference signal to arrive at the specific MBMS cell group within the long CP window for the specific MBMS cell group.

33. The MBMS data transmission system according to claim 13 wherein the scrambled MBMS reference signal and data arrives at the receiver within the long CP window for the specific MBMS cell group.

34. The method according to claim 14 wherein the multicast signals from the first cell group arrive at the receiving device within the long CP window for the first cell group.

35. The method according to claim 17 wherein the multicast signals from the neighboring cell groups arrive at the receiving device within the long CP window for the corresponding neighboring cell group.

36. The method according to claim 17, further comprising:
adding the first coherent combining signal and the neighboring coherent combining signals to generate a symbol combining signal for the multicast traffic data received by the receiving device.

37. The receiving device according to claim 20 wherein the multicast signals from the first cell group arrive at the receiver within the long CP window for the first cell group.

38. The receiving device according to claim 23 wherein the multicast signals from the neighboring cell groups arrive at the receiver within the long CP window for the corresponding neighboring cell group.

39. The receiving device according to claim 23, further comprising:
a non-coherent combining processor configured to add the first coherent combining signal and the neighboring coherent combining signals to generate a symbol combining signal for the multicast traffic data received by the receiver.

* * * * *